Sept. 3, 1935.  J. B. WATERS  2,013,225

FLOW OPERATED SWITCH

Filed Aug. 17, 1934

Inventor
Jay B. Waters
by Rippey & Kingsland
His Attorneys.

Patented Sept. 3, 1935

2,013,225

UNITED STATES PATENT OFFICE 2,013,225

FLOW OPERATED SWITCH

Jay B. Waters, St. Louis, Mo.

Application August 17, 1934, Serial No. 740,249

4 Claims. (Cl. 200—81)

This invention relates to an electric switch adapted to be operated by a current of fluid.

An object of this invention is to provide a switch having an element which may be placed in a current of fluid, either liquid or gas, to operate the switch when such current is flowing, and to produce such a switch which will be economical in construction, durable in service and easy of access for repair.

Other and specific objects will be apparent from the following detail description, taken in connection with the accompanying drawing.

Figure 1:
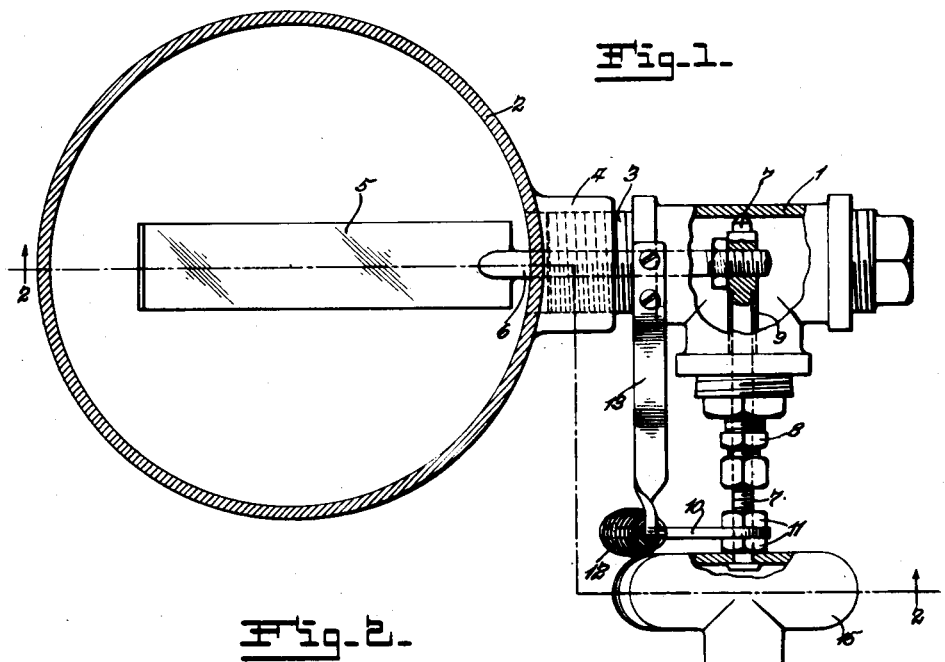
Fig. 1 is a plan view of a device embodying this invention, partly in section, shown in connection with a conduit with which the device may be installed.

The device includes a housing which is connected with a conduit with which the device is to be used. A paddle or impeller extends into the conduit and is secured within the housing to a rotatable shaft which extends through the wall of the housing and is journalled therein. A mercury tube switch is secured to the end of the shaft outside of the housing. The arrangement is such that when no current is flowing through the conduit the shaft will assume such a position that the mercury switch is tilted to off position. When current flows through the conduit the impeller will be moved, will turn the shaft, and will tilt the mercury switch to on position. It is understood, of course, that if desired the position of the switch may be adjusted so that it will be in on position when no current is flowing and in off position when current flows.

The foregoing is a general description of the device and the essential characteristics of the invention are pointed out in the appended claims. A more detail description of the invention, and of the preferred embodiment illustrated in the accompanying drawing, will presently be made.

The device includes a housing 1 communicating with a conduit 2. A nipple 3, secured to the housing, is threaded into an annular flange 4, integral with the conduit 2. A paddle or impeller 5 extends into the conduit 2 and is positioned laterally of the path of current in the conduit. A stem 6 for the paddle 5 extends into the housing and has its end rigidly secured to a shaft 7. The shaft 7 is journalled in a packing member 8 and extends therethrough to a point outside the housing.

The inner end of the shaft 7 is held against a wall of the housing 1 by reason of a spacing sleeve 9.

An arm 10 has one end rigidly secured to the shaft 7, by means of clamping nuts 11, and has its outer end connected to a contractile spring 12. The spring 12 is connected between the outer end of the arm 10 and a bracket 13, supported by the housing 1.

Figure 2:
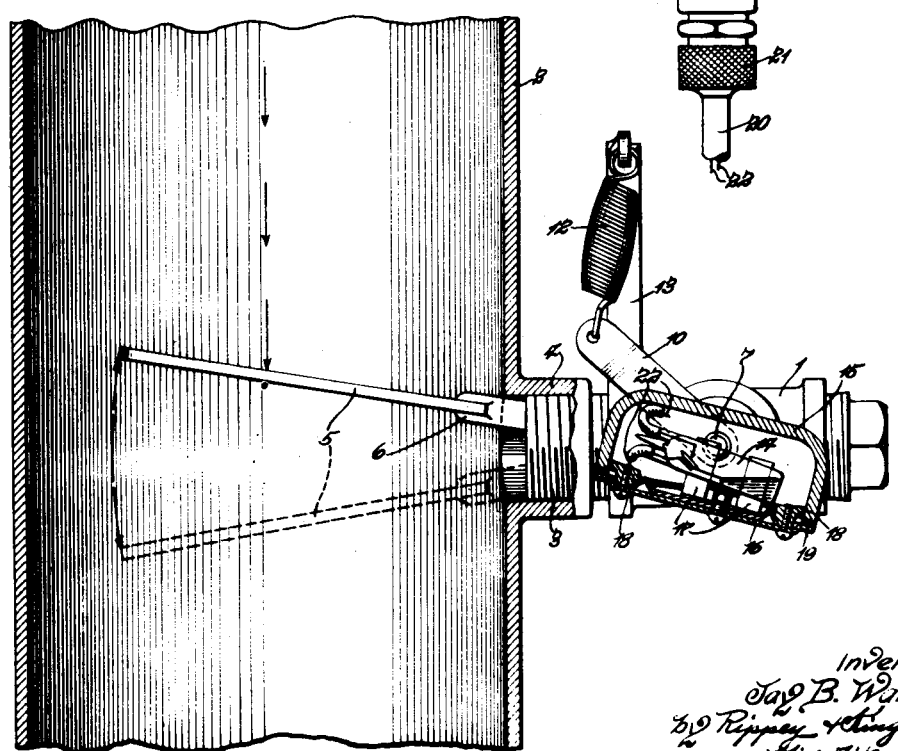
Fig. 2 is a sectional view taken approximately on the line 2—2, Fig. 1.

The arrangement is such that when no current is flowing in the conduit 2, the spring 12 will cause the shaft 7 and the impeller 5 to assume the position shown in solid lines Fig. 2. Upon the flow of current through the conduit 2, the impeller 5 will be deflected to the position shown in dotted lines Fig. 2, thereby oscillating the shaft 7.

A mercury tube 14 is supported relative to the shaft in such a position that when no current is flowing in the conduit 2, and the parts are in the relationship shown in solid lines Fig. 2, the mercury in the tube will lie away from the contacts of the mercury tube switch. When, however, current is flowing and the shaft 7 is turned, or oscillated, the mercury in the tube will connect the contacts and close a circuit in which the mercury tube may be connected.

A specific means for mounting the mercury tube 14 relative to the shaft 7 includes a casing 15, secured to the end of the shaft 7 and rotating therewith. A cover plate 16 carries clips 17 by which the mercury tube is secured to and supported by the cover plate 16. The cover plate 16 is secured to the housing by means of clamping members 18. A gasket 19 is clamped between the cover plate 16 and the casing 15. A cable 20 passes through a packing gland 21 to the interior of the casing 15, where it is connected to leads 22 of the mercury tube switch 14.

The operation of the device will be apparent from the foregoing description. The parts are so arranged that the mercury tube switch and the electrical connections are positioned in an hermetically sealed chamber, and the device is positive in operation and durable in service. The invention is not limited to any particular use but it has been found efficient in connection with regulating a supply of treating compound to feed water for boilers. The conduit 2 represents a conduit for the supply of water. When water flows through the conduit the switch will be placed in on position and an electrically operated pump, supplied by electrical current controlled by the mercury switch 14, will put in operation the supply of boiler treating compound. Thus, the treating compound will be supplied during the interval in which the water flows either to or from a treating tank through the conduit 2.

Various changes may be made in the details of construction, within the scope of the appended claims, without departing from the spirit of this invention.

I claim:

1. A device of the character described including a housing connected to and communicating with a conduit, a shaft extending through and journalled in a wall of the housing, an impeller secured to the shaft at a point within the housing, extending into the conduit and arranged to oscillate the shaft under the influence of a fluid current in the conduit, and a switch member connected outside the housing to the shaft and operable upon oscillation of the shaft to make and break a circuit in which said switch member is connected.

2. In combination with a conduit adapted to convey a fluid, a support, a shaft journalled in the support, an impeller secured to the shaft, extending into the conduit and arranged to oscillate the shaft under the influence of a fluid current in the conduit, a casing secured to the outer end of the shaft and oscillating therewith, said casing having a removable cover plate, and a mercury tube switch mounted on said cover plate within the casing and arranged when the shaft is in one position to close a circuit in which the switch is connected and when the shaft is in another position to break such circuit.

3. A flow operated switch including a housing adapted to be connected to a conduit and when so connected to communicate therewith, a shaft extending through and journalled in a wall of the housing, an impeller secured to the shaft at a point within the housing, extending outside the housing, adapted to extend into the conduit when the connection aforesaid is made and arranged to oscillate under the influence of a fluid current in the conduit, and a switch member outside the housing carried by said shaft and adapted upon oscillation by the shaft to make and break a circuit in which said switch member may be connected.

4. In combination with a conduit adapted to convey a fluid and having an aperture in its wall, a flow operated switch including a housing connected to said wall and communicating with the conduit through said aperture, a shaft extending through and journalled in a wall of the housing, an impeller secured to the shaft, extending into the conduit and arranged to oscillate the shaft under the influence of a fluid current in the conduit, and a switch member connected to the outer end of the shaft and operable upon oscillation of the shaft to make and break a circuit in which said member may be connected.

JAY B. WATERS.